United States Patent
Garmon

(10) Patent No.: US 11,463,651 B2
(45) Date of Patent: Oct. 4, 2022

(54) VIDEO FRAME-BASED MEDIA STREAM BANDWIDTH REDUCTION

(71) Applicant: Carrier Corporation, Palm Beach Gardens, FL (US)

(72) Inventor: Richard W. Garmon, Mystic, CT (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/093,853

(22) Filed: Nov. 10, 2020

(65) Prior Publication Data
US 2021/0195136 A1     Jun. 24, 2021

Related U.S. Application Data

(60) Provisional application No. 62/952,619, filed on Dec. 23, 2019.

(51) Int. Cl.
*H04N 5/917*     (2006.01)
*H04N 7/14*     (2006.01)

(52) U.S. Cl.
CPC ............. *H04N 5/917* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 7,400,633 B2 | 7/2008 | Krishnan | |
| 7,496,277 B2 | 2/2009 | Ackley et al. | |
| 7,555,559 B2 | 6/2009 | Chapweske | |
| 8,228,982 B2 | 7/2012 | Qian et al. | |
| 8,249,414 B2 | 8/2012 | Ackley et al. | |
| 8,285,250 B2 | 10/2012 | Rubin et al. | |
| 8,646,014 B2 | 2/2014 | Macinnis | |
| 8,683,535 B2 | 3/2014 | Macinnis | |

(Continued)

FOREIGN PATENT DOCUMENTS

| | | |
|---|---|---|
| EP | 1775953 A1 | 4/2007 |
| EP | 3350702 B1 | 4/2019 |
| WO | 15044104 A1 | 4/2015 |

OTHER PUBLICATIONS

EP Application No. 20213021.7 Extended EP Search Report dated Feb. 15, 2021, 8 pages.

(Continued)

*Primary Examiner* — Quoc D Tran
(74) *Attorney, Agent, or Firm* — Cantor Colburn LLP

(57) ABSTRACT

A video system includes one or more media sources and a media server configured to communicate with a video viewing device through a network. The media server includes memory and a processor configured to perform a plurality of operations. The operations include receiving a video stream from the one or more media sources, where the video stream includes one or more sequences of a key frame followed by one or more secondary frames. The operations also include determining whether throttling is enabled for the video stream, dropping the one or more secondary frames with transmission of the key frame to the video viewing device based on determining that throttling is enabled, and transmitting the key frame and the one or more secondary frames to the video viewing device based on determining that throttling is disabled.

17 Claims, 5 Drawing Sheets

(56) References Cited

U.S. PATENT DOCUMENTS

| | | |
|---|---|---|
| 8,695,047 B2 | 4/2014 | Chennupati |
| 8,867,886 B2 | 10/2014 | Feinson |
| 9,020,039 B2 | 4/2015 | Van Der Schaar |
| 9,137,551 B2 | 9/2015 | Cote et al. |
| 9,197,685 B2 | 11/2015 | Soroushian |
| 9,363,574 B1 * | 6/2016 | Ouellet ............... H04N 21/6373 |
| 9,379,990 B2 | 6/2016 | Lamouchi et al. |
| 9,380,266 B2 | 6/2016 | Pai |
| 9,450,879 B2 | 9/2016 | Rector |
| 9,490,948 B2 | 11/2016 | Doken et al. |
| 9,491,414 B2 | 11/2016 | Lasko |
| 9,537,917 B2 | 1/2017 | Ramamurthy |
| 9,704,393 B2 | 7/2017 | Acharya et al. |
| 9,894,126 B1 | 2/2018 | Block et al. |
| 9,954,919 B1 | 4/2018 | Khan et al. |
| 9,967,303 B2 | 5/2018 | Eriksson et al. |
| 10,142,381 B2 | 11/2018 | Nathan et al. |
| 10,171,540 B2 | 1/2019 | Soffer et al. |
| 10,353,962 B2 | 7/2019 | Choen et al. |
| 10,404,943 B1 | 9/2019 | Fieldman |
| 2003/0091000 A1 | 5/2003 | Chu et al. |
| 2007/0230581 A1 * | 10/2007 | Orr ....................... H04N 19/156 375/240.21 |
| 2008/0175273 A1 * | 7/2008 | Johansson ........ H04N 21/26616 370/473 |
| 2008/0291934 A1 | 11/2008 | Christenson et al. |
| 2009/0315886 A1 | 12/2009 | Drive et al. |
| 2010/0040134 A1 * | 2/2010 | Sun .................... H04N 21/2662 375/240.01 |
| 2011/0058036 A1 | 3/2011 | Metzger et al. |
| 2011/0310217 A1 * | 12/2011 | Lee ..................... H04N 19/172 348/14.08 |
| 2012/0106328 A1 * | 5/2012 | Gan ................. H04N 21/26216 370/230 |
| 2012/0303797 A1 * | 11/2012 | Mathur ............... H04L 65/4092 709/224 |
| 2013/0106980 A1 * | 5/2013 | Obaidi ................ H04L 65/1069 348/14.02 |
| 2013/0212227 A1 | 8/2013 | Thomas |
| 2015/0063462 A1 | 3/2015 | Balaraman |
| 2015/0156243 A1 | 6/2015 | Skog et al. |
| 2015/0189225 A1 | 7/2015 | Soroushian et al. |
| 2015/0373383 A1 | 12/2015 | Pichumani et al. |
| 2016/0173553 A1 | 6/2016 | Panje et al. |
| 2017/0347159 A1 | 11/2017 | Baik et al. |
| 2018/0184138 A1 | 6/2018 | Shaw et al. |
| 2018/0199082 A1 | 7/2018 | Shaw et al. |
| 2018/0205802 A1 | 7/2018 | Bowen |
| 2018/0330590 A1 | 11/2018 | Lasko |
| 2018/0367842 A1 | 12/2018 | Macinnis |
| 2019/0090006 A1 | 3/2019 | Travisano |
| 2019/0347487 A1 | 11/2019 | Booth et al. |
| 2021/0195137 A1 | 6/2021 | Garmon |

OTHER PUBLICATIONS

EP Application No. 20210755.3 Extended EP Search Report dated May 3, 2021, 8 pages.

B. Carle, VMS Bandwidth Saving Technologies—Security Today, Demand for video and improved resolution continues to increase in organizations, Feb. 1, 2017, 6 pages.

Fortinet, Understanding IP Surveillance Camera Bandwidth—High Performance Multi-Threat Security Solutions, May 11, 2017, 17 pages.

India Application No. 4412 CHE 2012, Entitled: System and Method for Throttling Bandwidth While Processing Video, Applicant: Blue Coat Systems, Inc., filed Oct. 22, 2012, 35 pages.

* cited by examiner

VIDEO FRAME-BASED MEDIA STREAM BANDWIDTH REDUCTION

CROSS-REFERENCE TO RELATED APPLICATION

This application claims the benefit of priority to U.S. Provisional Application No. 62/952,619 filed Dec. 23, 2019, the disclosure of which is incorporated herein by reference in its entirety.

BACKGROUND

The subject matter disclosed herein generally relates to the field of video networks, and more particularly to an apparatus and method for video frame-based media stream bandwidth reduction.

In some video display application, such as video surveillance, a client application may receive and display several video streams simultaneously. Video streamed from a video camera or a video recording device may have a high frame rate and resolution, which can consume a substantial amount of network bandwidth, memory, and processing resources when streamed over a network to a video display device. This can result in choppy and distracting video output at the video display device. Inconsistent video playback rates due to network loading can add post-processing challenges at the video display device. Further, when video bandwidth demands are high, other network traffic may experience increased latency.

BRIEF SUMMARY

According to one embodiment, a video system includes one or more media sources and a media server configured to communicate with a video viewing device through a network. The media server includes memory and a processor configured to perform a plurality of operations. The operations include receiving a video stream from the one or more media sources, where the video stream includes one or more sequences of a key frame followed by one or more secondary frames. The operations also include determining whether throttling is enabled for the video stream, dropping the one or more secondary frames with transmission of the key frame to the video viewing device based on determining that throttling is enabled, and transmitting the key frame and the one or more secondary frames to the video viewing device based on determining that throttling is disabled.

In addition to one or more of the features described above or below, or as an alternative, further embodiments may include identifying a media segment based on receiving a first instance of the key frame of the video stream, including the one or more secondary frames in the media segment based on determining that throttling is disabled for the video stream, marking the media segment as ready to transmit based on receiving a next instance of the key frame of the video stream, and transmitting the media segment to the video viewing device based on detecting that the media segment is marked as ready to transmit.

In addition to one or more of the features described above or below, or as an alternative, further embodiments may include where the one or more media sources provide a plurality of video streams to the media server, and throttling is selectable on a per video stream basis.

In addition to one or more of the features described above or below, or as an alternative, further embodiments may include where throttling is commanded in response to a throttling request received from the video viewing device.

In addition to one or more of the features described above or below, or as an alternative, further embodiments may include where throttling is commanded based on a status of the network.

In addition to one or more of the features described above or below, or as an alternative, further embodiments may include where throttling is commanded based on a status of the media server.

In addition to one or more of the features described above or below, or as an alternative, further embodiments may include where the one or more media sources include one or more of a video camera and a video recorder.

According to another embodiment, a method of controlling a video system includes receiving, at a media server, a video stream from one or more media sources, where the video stream includes one or more sequences of a key frame followed by one or more secondary frames. The method also includes determining whether throttling is enabled for the video stream, dropping the one or more secondary frames with transmission of the key frame from the media server through a network to a video viewing device based on determining that throttling is enabled, and transmitting the key frame and the one or more secondary frames to the video viewing device based on determining that throttling is disabled.

According to a further embodiment, a computer program product for controlling a video system is provided. The computer program product includes a computer readable storage medium having program instructions embodied therewith, the program instructions executable by a processor of a media server to cause the processor to perform a plurality of operations. The operations include receiving a video stream from one or more media sources, where the video stream includes one or more sequences of a key frame followed by one or more secondary frames. The operations further include determining whether throttling is enabled for the video stream, dropping the one or more secondary frames with transmission of the key frame from the media server through a network to a video viewing device based on determining that throttling is enabled, and transmitting the key frame and the one or more secondary frames to the video viewing device based on determining that throttling is disabled.

Technical effects of embodiments of the present disclosure include network bandwidth reduction during video streaming over a network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

In a video surveillance application, it is not uncommon for a client application to display video from several sources simultaneously. If the client application is browser-based and media is streamed over an Internet or Intranet, and if each of the media sources natively exists at a very-high frame rate (e.g., 30 frames per second) and a high resolution (e.g., high definition, ultra-high definition, etc.), the bandwidth utilization may result in degraded performance. Transcoding of video is one approach that attempts to combine/blend video data and/or change resolution, but transcoding can be costly from a processing resource perspective. Further, rendering multiple full-frame rate, full-resolution streams can also require a large amount of client system processing resource utilization, thereby consuming resources that could otherwise be used for running other applications. Embodiments of the disclosure provide throttling support to selectively reduce video stream bandwidth requirements while also avoiding the processing burdens of transcoding.

HTTP Live Streaming (HLS) and DASH (Dynamic Adaptive Streaming over HTTP) are two similar methodologies for streaming media (video/audio) over an Internet or Intranet to browser-based video client applications. DASH takes advantage of web browsers that support an application programming interface (API) known as Media Source Extensions (MSE). Both HLS and DASH/MSE support H.264, a known video encoding standard. An H.264 video stream can be characterized by two specific data types: I-frames and P-frames. Typically, an H.264 video stream is comprised of segments constructed as one timestamped I-frame followed by one or more timestamped P-frames. An I-frame is a fully encapsulated representation of a single image and may also be referred to herein as a "key frame". P-frames can contain changes relative to a previous frame and may also be referred to herein as "secondary frames". Rather than transcoding, embodiments of the disclosure can selectively drop P-frames or other types of secondary frames and only send I-frames as key frames to be displayed while throttling is active. Embodiments can be applied to other similar video formats, such as formats that use B-frames as bidirectionally predicted pictures, as an alternate secondary frame type as compared to P-frames.

Figure 1:
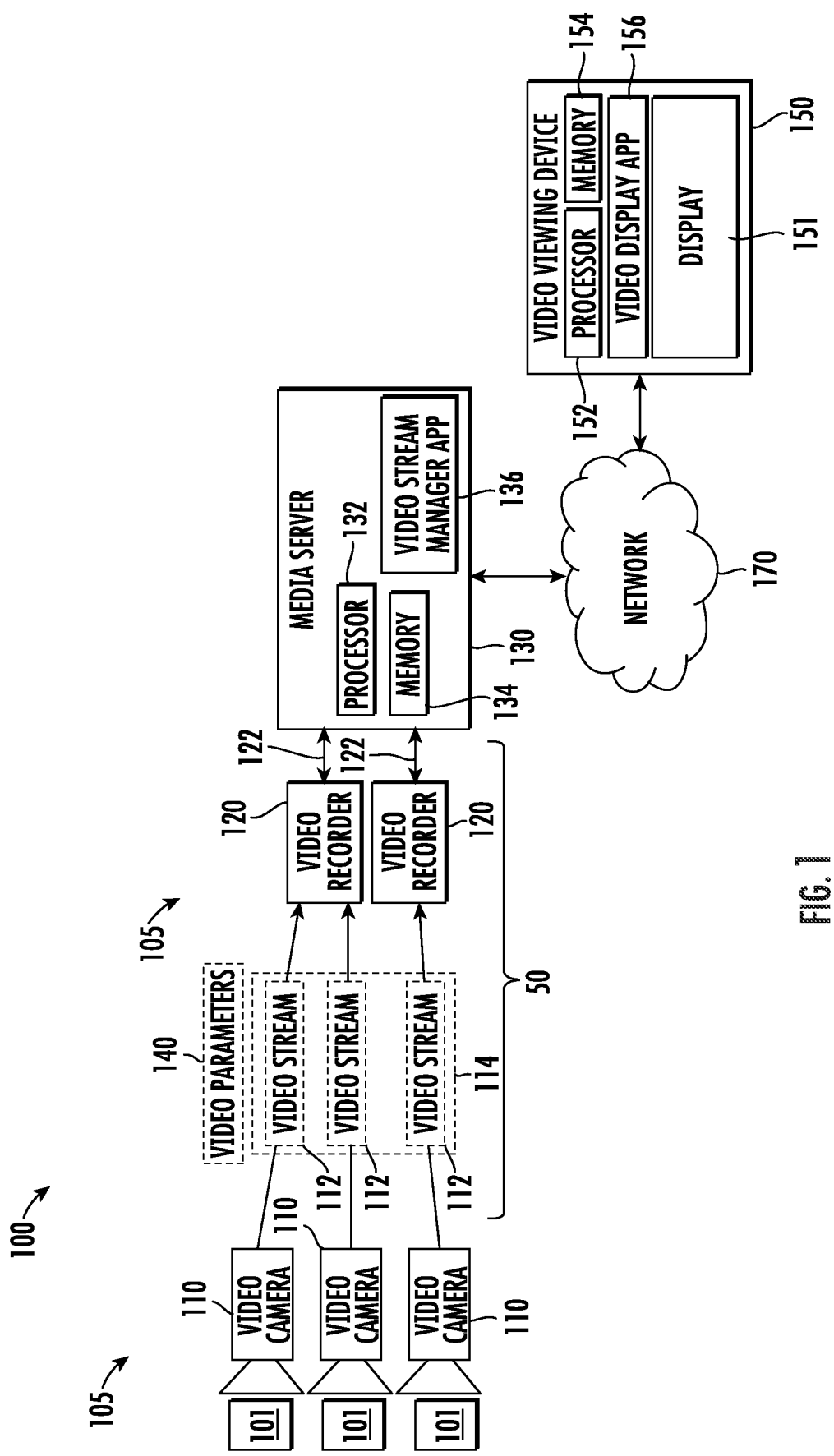
FIG. 1 illustrates a general schematic system diagram of a video system, in accordance with an embodiment of the disclosure.

FIG. 1 schematically illustrates a video system 100, in accordance with an embodiment of the present disclosure. It should be appreciated that, although particular systems are separately defined in the schematic block diagrams, each or any of the systems may be otherwise combined or separated via hardware and/or software. The video system 100 may include one or more media sources 105, such as one or more video cameras 110 and/or one or more video recorders 120. Each of the video cameras 110 may be positioned to capture video streams 112 of an area 101, for instance, as part of a surveillance system. The areas 101 of each camera 110 may overlap with areas of other video cameras 110 either partially or in full. Each video camera 110 may be adjustable to be repositioned to capture the same area 101 or multiple areas 101. Alternatively, one or more of the areas 101 can be at different geographic locations. The video recorders 120 can store video streams 112 from the video cameras 110 or video captured and/or processed from one or more different sources. Each of the video recorders 120 can capture video streams 112 from one or more of the video cameras 110.

The video system 100 can include a media server 130 that interfaces with one or more video viewing devices 150 through a network 170. The media server 130 can transmit the video streams 112 from the media sources 105 to the video viewing device 150 or may apply filtering by selectively throttling one or more of the video streams 112 before sending to the video viewing device 150.

The media server 130 may include a processor 132 and an associated memory 134 comprising computer-executable instructions that, when executed by the processor 132, cause the processor 132 to perform various operations. The instructions can be organized in one or more applications, such as a video stream manager application 136. The processor 132 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 134 may be but is not limited to a random access memory (RAM), read only memory (ROM), or other electronic, optical, magnetic or any other computer readable medium.

The video viewing device 150 may be a computing device capable of outputting video to a display 151, such as, for example, a desktop computer, a laptop computing, a tablet computer, a smart phone, a smart watch, or similar computing device known to one of skill in the art. Video viewing device 150 may include a processor 152 and an associated memory 154 comprising computer-executable instructions that, when executed by the processor 152, cause the processor 152 to perform various operations. The instructions can be organized in one or more applications, such as a video display application 156 that can interface with a web browser or be a standalone application. The processor 152 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 154 may be but is not limited to a random access memory (RAM), read only memory (ROM), or other electronic, optical, magnetic or any other computer readable medium.

The network 170 can include a number of network elements known in the art and may be part of a cloud architecture. The network 170 can manage traffic from many sources beyond those depicted in FIG. 1 and may be part of the Internet or an Intranet. The network 170 can include wired, wireless, and/or optical communication links.

In embodiments of the disclosure, the video cameras 110 can capture video frames and transmit the video frames in video streams 112 to the media server 130. The video streams 112 from one or more video cameras 110 can be sent through video recorders 120 and arrive at the media server 130 as one or more incoming streams 122. The video frames of the video streams 112 may be organized into packets 114 by the video cameras 110 or other supporting equipment.

The video packets 114 can contain information such as, for example, an IP address from where the video packets 114 are coming from, an IP address where to send the video packets 114, a type of the video frame, a number of video frames, time stamps of each video frame, and video parameters 140 discussed further herein. The video packets 114 can be independently formed by each of the video cameras 110 such that each video packet 114 is associated with one of the video streams 112. Alternatively, portions of two or more of the video streams 112 may be combined within the same video packet 114, for instance, where a data concentrator or other such device (not depicted) is used to gather and send video data to the media server 130. In some embodiments, video packets 114 can be processed, modified, and/or generated by one or more of the video recorders 120. The video packets 114 may be processed by the video stream manager application 136 of the media server 130 and be further transmitted to video viewing device 150. The video packets 114 can be received at the video viewing device 150, decoded, and sent to display 151, which then visually displays the video frames received. The video display application 156 can control, for example, which of the video streams 112 to display at a full frame rate and which of the video streams 112 should be throttled by the video stream manager application 136 of the media server 130, for instance, based on a user selection.

The video stream manager application 136 may use various data sources to determine when to apply throttling to reduce the bandwidth needed for transmitting one or more of the video streams 112 to the video viewing device 150 through the network 170. Throttling can include retaining key frames of a video stream 112 and dropping secondary frames, such that a sequence of images is still transmitted in a protocol compliant format, but a slower update rate of the images results. Throttling can be commanded based on observed characteristics of the media server 130, the network 170, and/or the video viewing device 150. For example, a user-initiated throttle request detected at the video display application 156 can be sent to the video stream manager application 136 for the video stream manager application 136 to throttle one or more video streams 112 identified by the user-initiated request. The video stream manager application 136 can also monitor characteristics associated with the video streams 112 and performance of the network 170 to initiate throttling when media server 130 initiated throttling is supported or enabled. For example, latency of the network 170 can be monitored by sending periodic requests for responses to the video viewing device 150 and tracking a total time metric between the sending the request and receiving the response. Other known network traffic monitoring and performance metrics can also be used to determine an availability or congestion level of the network 170.

In some embodiments of the disclosure, the media server 130 can collect and analyze video parameters 140 of the video streams 112 and/or video packets 114. The video parameters 140 can include statistical information regarding the video streams 112 and/or the video packets 114. The video parameters 140 may include but are not limited to time between video frames, time between video packets 114, a sequential number of video frames, and a sequential number of a video packet 114, a group of pictures (GOP) structure, a size of the video packet 114, and a real frame per second (FPS) value. The size of the video packet 114 may be used, for example, to calculate frame size and bandwidth to predict the likely impact of selecting one or more associated video streams 112 for throttling.

The video streams 112 and/or video packets 114 can be collected in one or more incoming streams 122 of the media server 130 and buffered in memory 134 of the media server 130. The video stream manager application 136 can collect the video parameters 140 of the incoming streams 122 along a path 50 from the video cameras 110 and video recorders 120. The path 50 between the video cameras 110, video recorders 120, and the media server 130 may be hardwired and/or wireless. In some embodiments, one or more video recorders 120 can be separately coupled to the media server 130 and/or video cameras 110 can be directly coupled to the media server 130 without passing through video recorders 120. The collection of the video parameters 140 can support a quantitative analysis to determine when throttling may be beneficial, such as, for example, a delay between GOPs, a delay video frames, lost video packets 114, delays in video packet 114 delivery, irregularity in video frame bandwidth, and/or irregularity in video frame delivery.

Although not shown for simplicity, the video cameras 110, video recorders 120, and network 170 may also include at least one processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Figure 2:
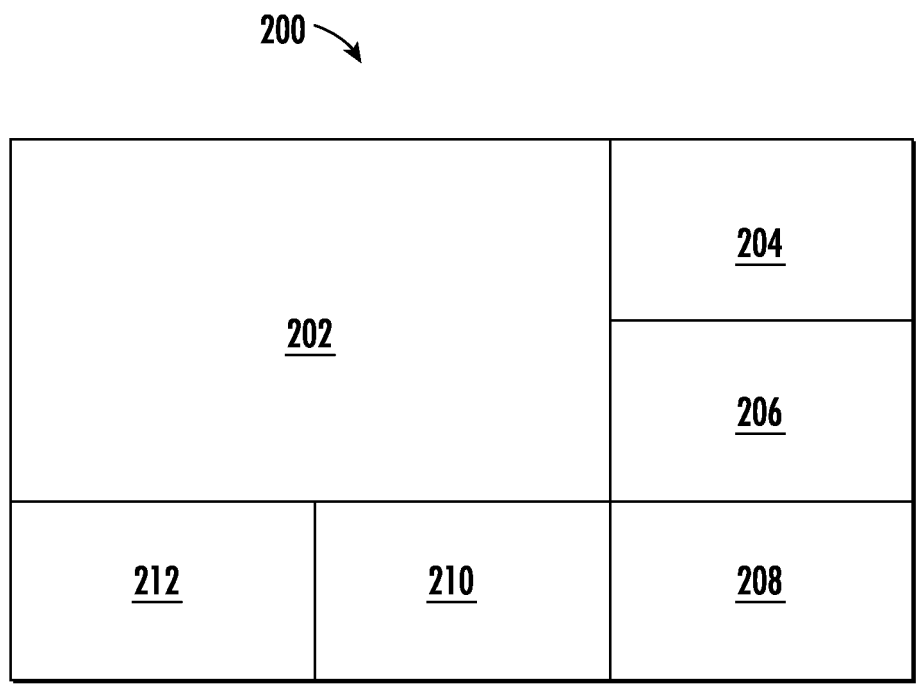
FIG. 2 illustrates a display with multiple video streams, in accordance with an embodiment of the disclosure.

FIG. 2 illustrates an example configuration 200 of the display 151 of FIG. 1 to output multiple video streams 112 of FIG. 1 in parallel. In the example of FIG. 2, six video streams 112 can be output to the display 151 by the video display application 156, for instance, from six instances of the video cameras 110 of FIG. 1 as live video feeds with respect to areas 101 of FIG. 1. A first display location 202 may have a largest viewing area and provide an unthrottled version of a selected video stream 112. Display locations 204, 206, 208, 210, and 212 may have reduced size as compared to the first display location 202. Each of the display locations 202-212 may be associated with a different video camera 110. As one example, the video display application 156 can send a command to the video stream manager application 136 to transmit the video stream 112 associated with the first display location 202 with throttling disabled and to transmit the video streams 112 associated with display locations 204, 206, 208, 210, and 212 with throttling enabled. Thus, all video frames of the video stream 112 associated with the first display location 202 can be transmitted to the video viewing device 150, while secondary frames of the video streams 112 associated with display locations 204-212 can be dropped by the video stream manager application 136 and not be sent to the video viewing device 150. If a user desires to view the video stream 112 associated with display location 210 with greater detail, a selection can be made through the video display application 156 to remap the video stream 112 associated with the first display location 202 to the display location 210 while also requesting throttling of the video stream 112. The video display application 156 can also remap the video stream 112 associated with display location 210 to be output to the first display location 202 and send a throttling disable command to the video stream manager application 136, such that the video stream 112 now associated with the first display location 202 is transmitted without throttling.

It will be understood that many user interface variations can be implemented in exemplary embodiments, and FIG. 2 represents one such example. Further, with respect to FIG. 2, any of the video streams 112 associated with the display locations 202-212 can be independently throttled or throttled in groups depending upon the implementation.

Figure 3:
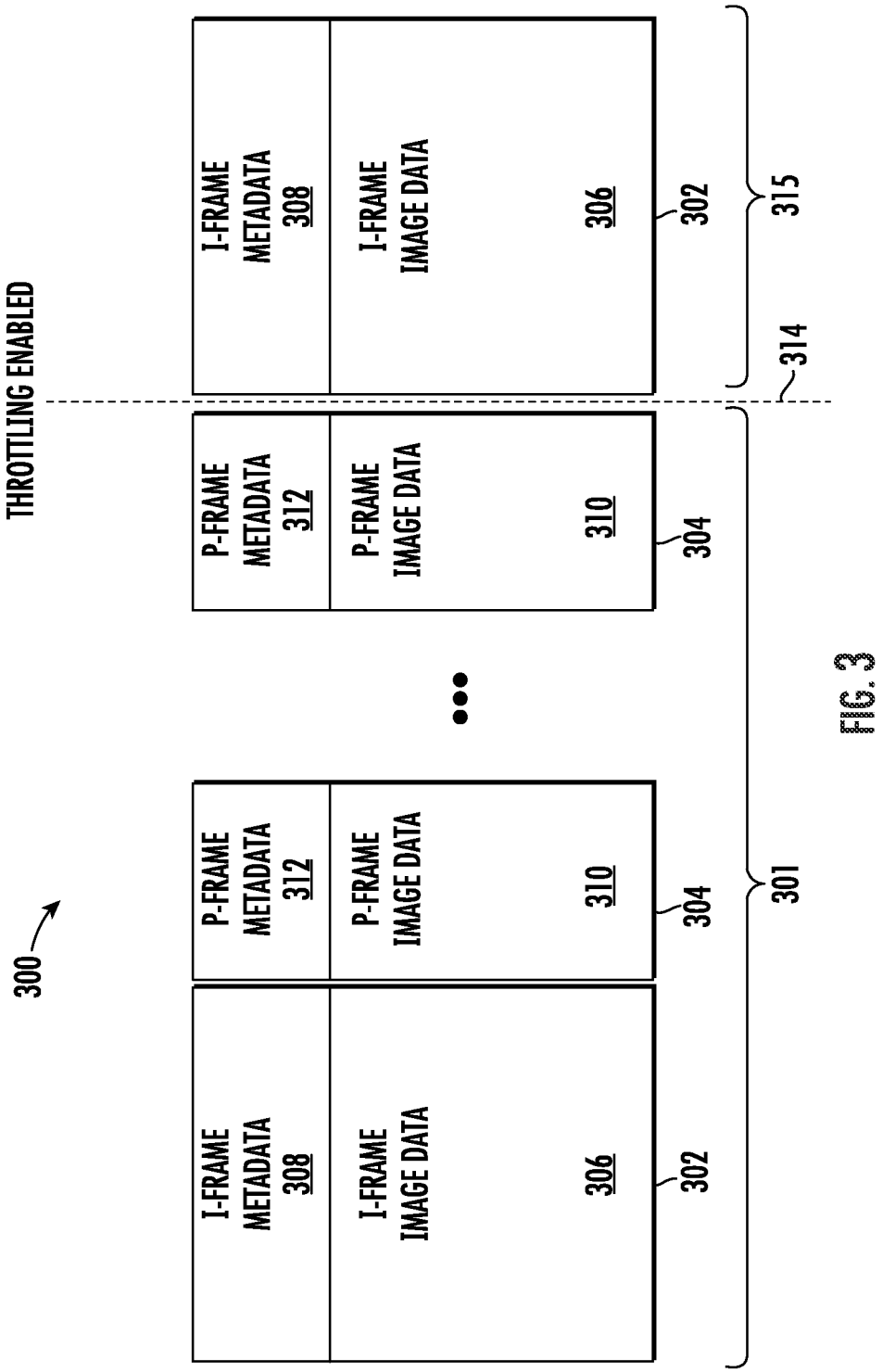
FIG. 3 illustrates a video stream with throttling, in accordance with an embodiment of the disclosure.

FIG. 3 illustrates an example of a video stream 300 with throttling. A first media segment 301 can include a key frame 302 and one or more secondary frames 304. The key frame 302 can be an I-frame that includes I-frame image data 306 and a I-frame metadata 308. The I-frame image data 306 can include an encoded image and the I-frame metadata 308 can include timestamp, sequence information, encoding information, and other such data. The one or more secondary frames 304 can be P-frames that include P-frame image data 310 and P-frame metadata 312. The P-frame image data 310 can include change information relative to the I-frame image data 306 and the sequence of P-frame image data 310 as time elapses. The amount of data in the P-frame image data 310 of each of the secondary frames 304 may be less than the amount of data in the I-frame image data 306 as the P-frame image data 310 does not include a full image. The first media segment 301 can be delimited by the next instance of a key frame 302 in the video stream 300. When throttling is disabled, the key frame 302 and all of the secondary frames 304 of first media segment 301 can be transmitted from the media server 130 to the video viewing device 150 of FIG. 1. When throttling is enabled 314, the next media segment 315 only includes the next instance of the key frame 302, and all secondary frames 304 received at the media server 130 are dropped and not sent to the video viewing device 150. As such, only key frames 302 (e.g., I-frames) are transmitted to the video viewing device 150 when throttling is enabled 314.

Notably, when throttling is enabled 314 and video recording to the video recorders 120 of FIG. 1 is active, the full content of the video stream 300 may be recorded, including the secondary frames 310, since the video recorders 120 are not coupled through the network 170 of FIG. 1. Therefore, if a user is concerned that video details were not available to view at the video viewing device 150 due to throttling, the user could subsequently playback a copy of the video stream 300 recorded by the video recorders 120 without throttling to see the full frame rate details.

Figure 4:
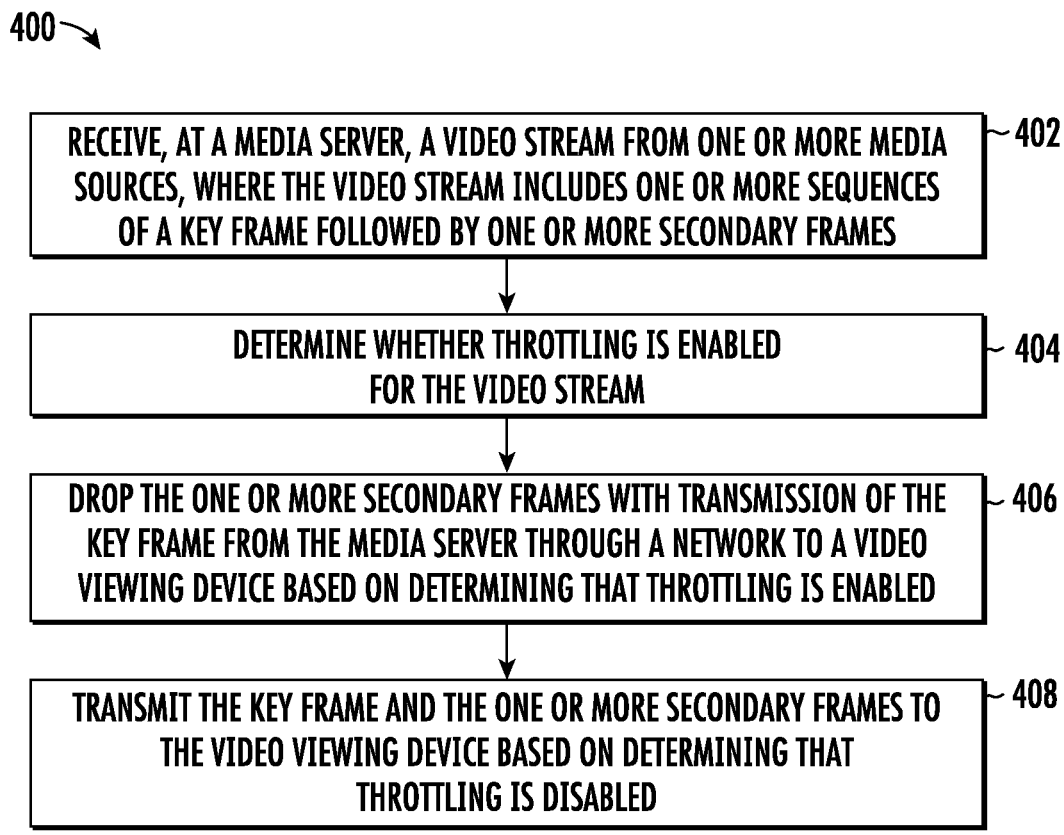
FIG. 4 is a flow diagram illustrating a method, according to an embodiment of the present disclosure.

Referring now to FIG. 4, with continued reference to FIGS. 1-3, a flow chart of method 400 of controlling a video system 100 is illustrated, in accordance with an embodiment of the present disclosure. In an embodiment, the method 400 is performed by the media server 130.

The video stream manager application 136 and the video display application 156 may each be a computer program product embodied on a computer readable medium. The method 400 can be performed by the video stream manager application 136 in conjunction with support provided by the video display application 156. The video stream manager application 136 (i.e., computer program product) may include instructions that, when executed by the processor 132, cause the processor 132 to perform operations comprising method 400. In one embodiment, the computer readable medium where the video stream manager application 136 is stored may be located within the memory 134 of the media server 130. In another embodiment, the computer readable medium where the video stream manager application 136 is stored may be located external to the media server 130 but be readable by the media server 130.

At block 402, the media server 130 receives a video stream 112 from one or more media sources 105, where the video stream 112 includes one or more sequences of a key frame 302 followed by one or more secondary frames 304, such as video stream 300. The one or more media sources 105 can be one or more of a video camera 110 and a video recorder 120.

At block 404, the media server 130 determines whether throttling is enabled 314 for the video stream 112. Throttling status can be tracked on a per video stream 112 basis, for instance, using a flag or variable stored in memory 134.

At block 406, the media server 130 drops the one or more secondary frames 304 with transmission of the key frame 302 from the media server 130 through a network 170 to a video viewing device 150 based on determining that throttling is enabled 314.

At block 408, the media server 130 transmits the key frame 302 and the one or more secondary frames 304 to the video viewing device 150 based on determining that throttling is disabled (i.e., throttling is not enabled).

The method 400 may include identifying a media segment 301 based on receiving a first instance of the key frame 302 of the video stream 300. The media server 130 can include one or more secondary frames 304 in the media segment 301 based on determining that throttling is disabled for the video stream 300, mark the media segment 301 as ready to transmit based on receiving a next instance of the key frame 302 of the video stream 300, and transmit the media segment 301 to the video viewing device 150 based on detecting that the media segment 301 is marked as ready to transmit. The one or more media sources 105 can provide a plurality of video streams 112 to the media server 130, and throttling can be selectable on a per video stream 112 basis. Throttling can be commanded in response to a throttling request received from the video viewing device 150. Further, throttling can be commanded based on a status of the network 170. In some embodiments, throttling can be commanded based on a status of the media server 130.

Figure 5:
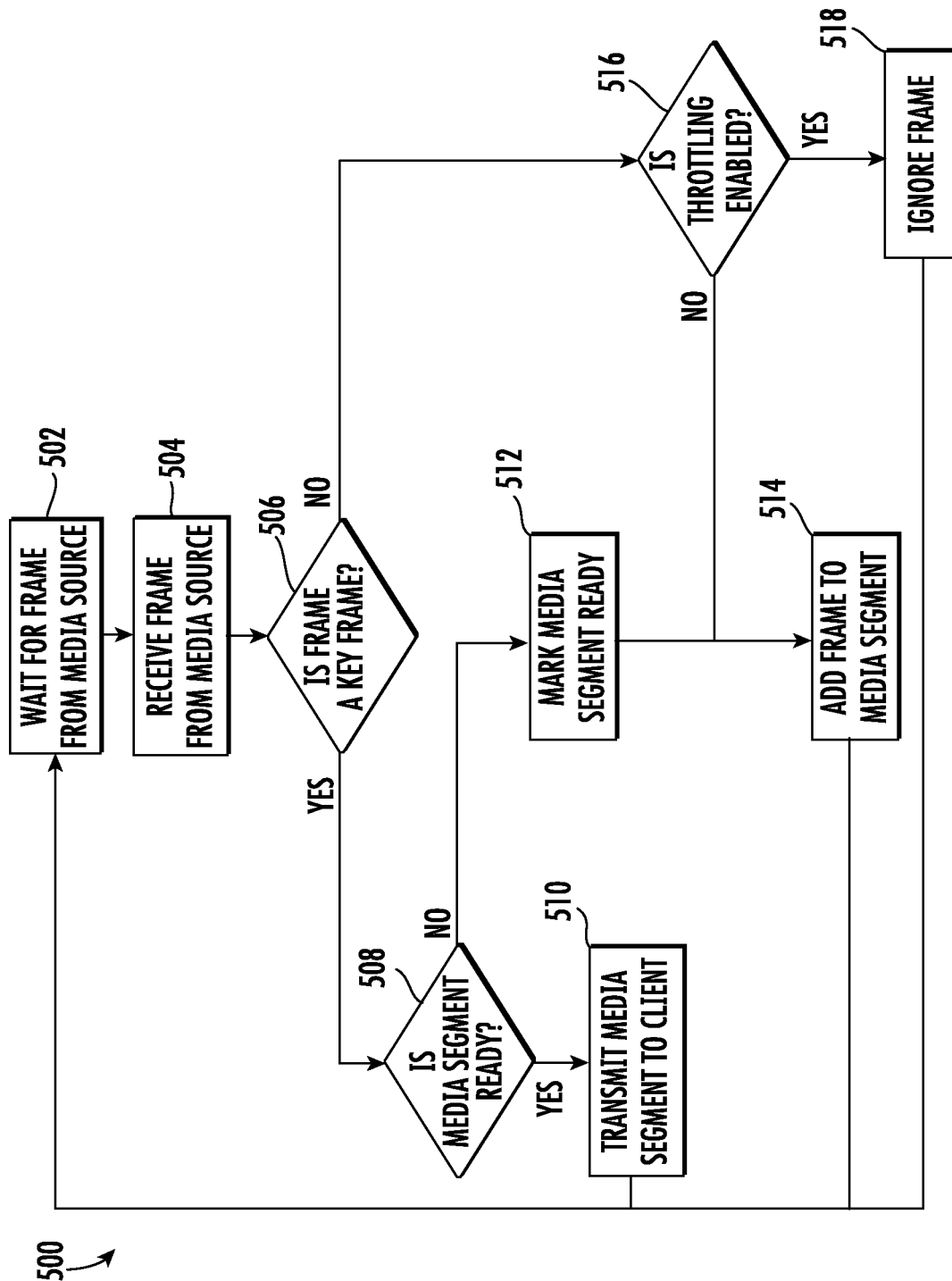
FIG. 5 is a flow diagram illustrating a method, according to an embodiment of the present disclosure.

FIG. 5 depicts a further example of a method 500 for controlling the video system 100 of FIG. 1. FIG. 5 is described with respect to FIGS. 1-4 and may be performed by the video stream manager application 136. At block 502, the media server 130 can wait for a frame from a media source 105. At block 504, the media server 130 receives a frame from the media source 105. At block 506, the media server 130 determines whether the frame is a key frame 302, which can be determined, for example, based on the I-frame metadata 308 and/or video parameters 140.

At block 508, based on determining that the frame is a key frame 302, the media server 130 can determine whether a media segment 301 is ready (e.g., based on a ready status flag). At block 510, if the media segment 301 is ready, the media server 130 can transmit the media segment 301 to the video viewing device 150 and the flow returns to block 502. At block 512, if the media segment 301 is not ready, the media server 130 can mark the media segment 301 as ready. At block 514, the frame is added to the media segment 301 and the flow returns to block 502.

At block 516, if the frame is not the key frame 302 (i.e., it is a secondary frame 304), the media server 130 can determine whether throttling is enabled 314. If throttling is not enabled at block 516, the flow continues to block 514. At block 518, if throttling is enabled, the media server 130 can drop the frame or otherwise ignore it, and the flow returns to block 502.

By delivering only I-frames, the resulting video stream is still HLS and DASH/MSE compliant but reduces the bandwidth without transcoding and reduces the resource utilization of the video viewing device 150. While the above description has described the flow processes of FIGS. 4 and 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A video system comprising:
   one or more media sources; and
   a media server configured to communicate with a video viewing device through a network, the media server comprising memory and a processor configured to perform a plurality of operations comprising:
   receiving a plurality of video streams from the one or more media sources, wherein each of the video streams comprises one or more sequences of a key frame followed by one or more secondary frames;
   determining whether throttling is enabled for each of the video streams, wherein throttling is selectable on a per video stream;
   dropping the one or more secondary frames with transmission of the key frame to the video viewing device based on determining that throttling is enabled for one or more selected video streams of the plurality of video streams; and
   transmitting the key frame and the one or more secondary frames to the video viewing device based on determining that throttling is disabled.

2. The video system of claim 1, wherein the operations further comprise:
   identifying a media segment based on receiving a first instance of the key frame of the video stream;
   including the one or more secondary frames in the media segment based on determining that throttling is disabled for the video stream;
   marking the media segment as ready to transmit based on receiving a next instance of the key frame of the video stream; and
   transmitting the media segment to the video viewing device based on detecting that the media segment is marked as ready to transmit.

3. The video system of claim 1, wherein throttling is commanded based on a status of the network.

4. The video system of claim 1, wherein throttling is commanded based on a status of the media server.

5. The video system of claim 1, wherein the one or more media sources comprise one or more of a video camera and a video recorder.

6. A method of controlling a video system, the method comprising:
   receiving, at a media server, a plurality of video streams from one or more media sources, wherein each of the video streams comprises one or more sequences of a key frame followed by one or more secondary frames;
   determining whether throttling is enabled for each of the video streams, wherein throttling is selectable on a per video stream;
   dropping the one or more secondary frames with transmission of the key frame from the media server through a network to a video viewing device based on determining that throttling is enabled for one or more selected video streams of the plurality of video streams; and
   transmitting the key frame and the one or more secondary frames to the video viewing device based on determining that throttling is disabled.

7. The method of claim 6, further comprising:
   identifying a media segment based on receiving a first instance of the key frame of the video stream;
   including the one or more secondary frames in the media segment based on determining that throttling is disabled for the video stream;
   marking the media segment as ready to transmit based on receiving a next instance of the key frame of the video stream; and
   transmitting the media segment to the video viewing device based on detecting that the media segment is marked as ready to transmit.

8. The method of claim 6, wherein throttling is commanded based on a status of the network.

9. The method of claim 6, wherein throttling is commanded based on a status of the media server.

10. The method of claim 6, wherein the one or more media sources comprise one or more of a video camera and a video recorder.

11. A computer program product for controlling a video system, the computer program product comprising a computer readable storage medium having program instructions embodied therewith, the program instructions executable by a processor of a media server to cause the processor to perform:
   receiving a plurality of video streams from one or more media sources, wherein each of the video streams comprises one or more sequences of a key frame followed by one or more secondary frames;
   determining whether throttling is enabled for each of the video streams, wherein throttling is selectable on a per video stream;
   dropping the one or more secondary frames with transmission of the key frame from the media server through a network to a video viewing device based on determining that throttling is enabled for one or more selected video streams of the plurality of video streams; and
   transmitting the key frame and the one or more secondary frames to the video viewing device based on determining that throttling is disabled.

12. The computer program product of claim 11, wherein the program instructions are executable by the processor perform:
   identifying a media segment based on receiving a first instance of the key frame of the video stream;
   including the one or more secondary frames in the media segment based on determining that throttling is disabled for the video stream;
   marking the media segment as ready to transmit based on receiving a next instance of the key frame of the video stream; and
   transmitting the media segment to the video viewing device based on detecting that the media segment is marked as ready to transmit.

13. The computer program product of claim 11, wherein throttling is commanded based on a status of the network.

14. The computer program product of claim 11, wherein throttling is commanded based on a status of the media server.

15. The video system of claim 1, wherein all image frames of one of the video streams associated with a first display location are transmitted to the video viewing device, while a plurality of secondary frames of the video streams associated with one or more display locations having a reduced size as compared to the first display location are dropped.

16. The method of claim 6, wherein all image frames of one of the video streams associated with a first display location are transmitted to the video viewing device, while a plurality of secondary frames of the video streams associated with one or more display locations having a reduced size as compared to the first display location are dropped.

17. The computer program product of claim 11, wherein all image frames of one of the video streams associated with a first display location are transmitted to the video viewing device, while a plurality of secondary frames of the video streams associated with one or more display locations having a reduced size as compared to the first display location are dropped.

* * * * *